Figure 4:
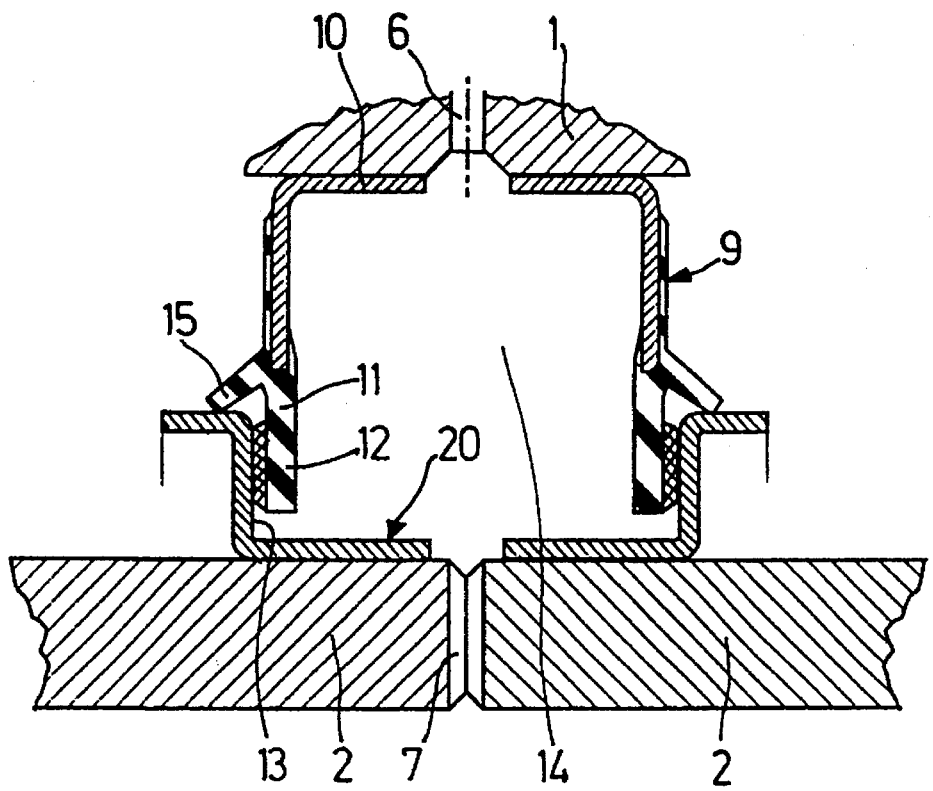

United States Patent [19]

Caillaut et al.

[11] Patent Number: 5,484,213
[45] Date of Patent: Jan. 16, 1996

[54] ROLLING-CONTACT BEARING EQUIPPED WITH A SEALING DEVICE FOR PASSAGE OF FLUID

[75] Inventors: Claude Caillaut, Saint Roch; Christophe Bonnin; Christophe Houdayer, both of Tours; Christian Rigaux, Artannes sur Indre; Martha Berges; Eric Beghini, both of Tours; Marc Defossez, Parcay Meslay; Olivier Message, Tours, all of France

[73] Assignee: SKF France, Clamart Cedex, France

[21] Appl. No.: 346,298

[22] Filed: Nov. 23, 1994

[30] Foreign Application Priority Data

Dec. 1, 1993 [FR] France ............................... 93 14396

[51] Int. Cl.$^6$ ........................... F16C 33/72; B60C 23/00
[52] U.S. Cl. ........................................ 384/486; 152/417
[58] Field of Search ............................... 384/477, 484, 384/486; 152/417

[56] References Cited

U.S. PATENT DOCUMENTS

| | | | |
|---|---|---|---|
| 2,967,906 | 3/1961 | Wunibald et al. | 152/417 |
| 3,705,614 | 12/1972 | Juttner et al. | 152/417 |
| 4,632,404 | 12/1986 | Feldle et al. | 384/486 X |
| 4,932,451 | 6/1990 | Williams et al. | 152/417 |
| 5,067,732 | 11/1991 | Szabo et al. | 384/484 X |
| 5,080,157 | 1/1992 | Oerter | 152/417 |
| 5,354,391 | 10/1994 | Goodell et al. | 384/484 X |

FOREIGN PATENT DOCUMENTS

| | | |
|---|---|---|
| 0204085 | 12/1986 | European Pat. Off. . |
| 036921 | 4/1990 | European Pat. Off. . |
| 410723 | 1/1991 | European Pat. Off. ............... 152/417 |
| 653815 | 3/1929 | France . |
| 2918481 | 11/1980 | Germany . |
| 3213552 | 10/1983 | Germany . |

*Primary Examiner*—Thomas R. Hannon
*Attorney, Agent, or Firm*—Beveridge, DeGrandi, Weilacher & Young

[57] ABSTRACT

The rolling-contact bearing comprises a rotating race and a non-rotating race through each of which there pass ducts (6, 7) for passage of fluid, rolling elements (3) between the rotating and non-rotating races, and a sealing device (8) fitted between the rotating and non-rotating races in order to form a leaktight intermediate chamber (14) communicating with the ducts (6, 7) for the passage of fluid. The intermediate chamber has two flexible walls (11) of which the free end parts form two sealing lips (12) in frictional contact with a contact surface (13) of one of the races (2) of the bearing. The frictional contact surfaces (13) are inclined with respect to the axis (XX') of rotation of the bearing. The flexible walls (11) extend substantially parallel to the contact surfaces so that the contact pressure between the sealing lips and the surfaces varies in the same direction as the pressure of the fluid in the intermediate chamber (14) of the sealing device.

23 Claims, 2 Drawing Sheets

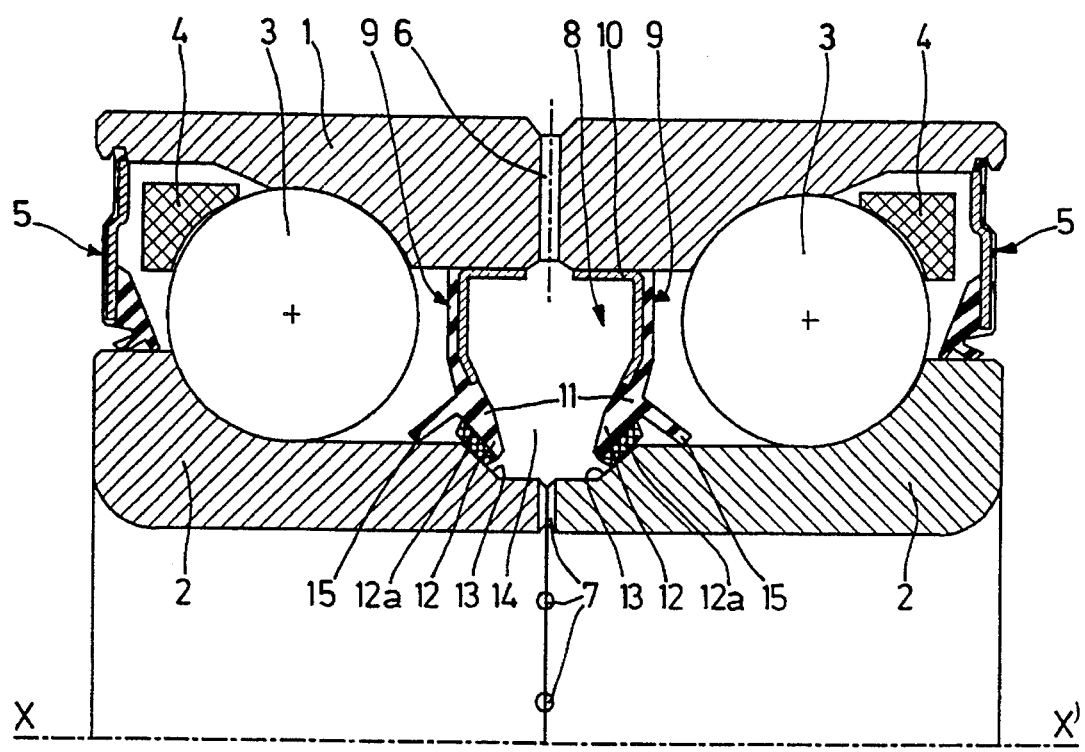
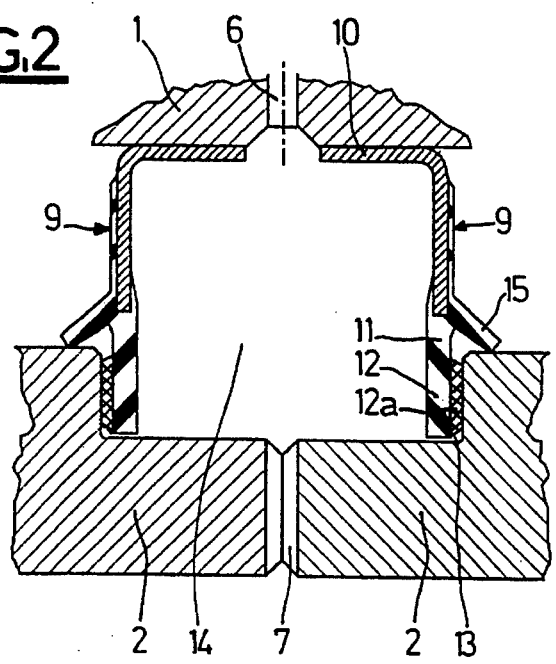
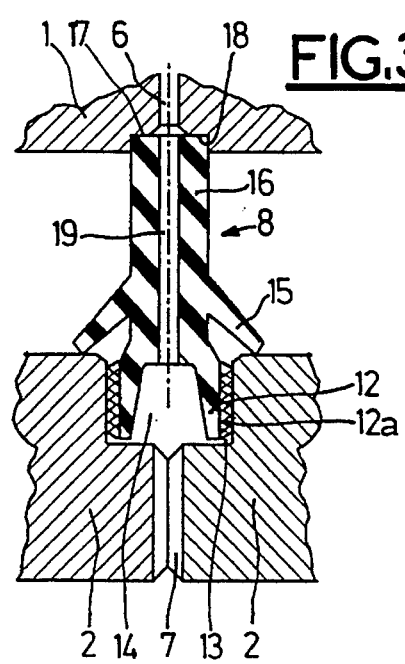

ROLLING-CONTACT BEARING EQUIPPED WITH A SEALING DEVICE FOR PASSAGE OF FLUID

The present invention relates to the field of sealing for the passage of a fluid between two components, one of which is given a rotational movement with respect to the other. In particular, the invention relates to a rolling-contact bearing equipped with a fluid passage which passes through the rotating and non-rotating races of the bearing, as well as a sealing device for the passage of the fluid through the bearing.

European Patent Application 0,362,921 (SKF) makes known a rolling-contact bearing equipped with a sealing device fitted between two rows of balls and between the orifices made on the outer race and the orifices made on the inner race of the bearing so as to allow the passage of a fluid through the bearing. This bearing makes it possible to establish communication between two chambers containing a pressurized fluid. The sealing device, on the one hand, allows the passage of the fluid through the bearing and, on the other hand, prevents the bearing lubricant, such as grease, from penetrating into the areas of passage of the fluid through the bearing. This sealing device however exhibits a significant axial size, which may be incompatible with certain applications.

A common application of this technique is intended for the monitoring and regulation of the pressure of the tires of a vehicle, the sealing device for passage of fluid being fitted in the wheel bearing of the vehicle.

Other devices for the passage of air through the hubs of wheels are also known, using a pair of seals to allow the leaktight passage of air between the rotating and stationary parts of the hub (see, for example, European Patent Applications 0,204,085 and 0,208,540). Each seal includes a metal skeleton onto which a sealing lip is overmoulded. The seals are secured to the stationary part of the hub by means of their metallic skeleton, their sealing lips being in frictional contact with a cylindrical contact surface formed on the rotating part of the hub. Each sealing lip is supported by an axial portion of the seal having a certain flexibility in the axial direction. Thus, the pressure exerted by the fluid on this axial portion supporting the sealing lip results in a certain contact pressure of the sealing lip on the cylindrical contact surface of the rotating part in addition to the contact pressure due to the mechanical preload of the sealing lip on the cylindrical contact surface.

However, the presence of an axial portion for each seal in order to support its sealing lip results in a significant axial size which may be incompatible with certain applications.

The object of the present invention is to overcome the aforementioned drawbacks of the existing techniques by providing a rolling-contact bearing equipped with an effective sealing device and exhibiting a reduced axial size to allow it to be incorporated easily into the bearing.

Another object of the invention is to provide a device for sealing against the fluid passing through the bearing for which the contact pressure of the sealing lips with respect to a contact surface of the bearing varies in the same direction as the pressure of the fluid passing through the sealing device.

The sealing device is located between a rotating race and a non-rotating race of a rolling-contact bearing in order to allow the passage of a fluid between the said races, each of which has ducts for the passage of fluid passing through them. A leaktight intermediate chamber of annular shape is thus formed between the rotating and non-rotating races of the bearing and communicates with the ducts, in the said races, for the passage of fluid. The sealing device is fitted so as to be stationary on one of the races, which may be rotating or non-rotating, the intermediate chamber extending toward the other race via flexible walls of which the end part constitutes a sealing lip which is in frictional contact with respect to a contact surface of the other race of the bearing.

According to the invention, the frictional contact surfaces of the other race are axisymmetric surfaces inclined with respect to the axis of rotation of the bearing. The flexible walls of the leaktight intermediate chamber are substantially parallel to the frictional contact surfaces so that the contact pressure between the sealing lips and the contact surfaces varies in the same direction as the pressure of the fluid in the intermediate chamber.

The frictional contact surfaces of the bearing have segments of a straight line or segments of a curve as their generatrices. The inclination of the said surfaces with respect to the axis of the bearing preferably lies between 10° and 90° for the purpose of reducing the axial extent of the flexible walls of the leaktight intermediate chamber and of the sealing lips of the sealing device.

The sealing lips of the sealing device may include, in their rubbing zone, a coating which has better frictional and sealing characteristics compared to the rest of the lips. The product known under the name of Teflon is entirely satisfactory in this respect. Advantageously, the flexible walls of the intermediate chamber also have two secondary outer sealing lips for the lubricant contained in the bearing. The secondary sealing lips make it possible to protect the rubbing zones of the lips for sealing against the fluid from the lubricant of the bearing.

Figure 5:
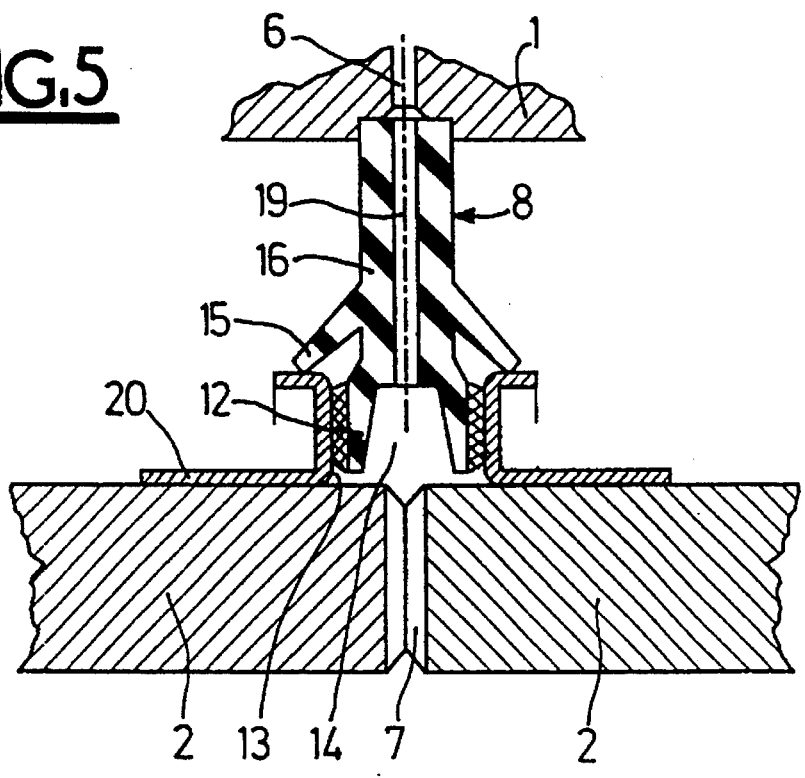

The invention will be better understood on studying the detailed description of a few embodiments taken without any limitation being implied and illustrated by the appended drawings, in which:

FIG. 1 is a partial view in axial section of a rolling-contact bearing equipped with a sealing device according to a first embodiment of the invention, FIG. 2 is a detail similar to FIG. 1 representing a second embodiment of the invention, FIG. 3 is a detail similar to FIG. 1 representing a third embodiment of the invention, FIG. 4 is a view similar to FIG. 2 representing a fourth embodiment of the invention, and FIG. 5 is a view similar to FIG. 3 representing a fifth embodiment of the invention.

The rolling-contact bearing illustrated in FIG. 1 comprises an outer race 1, an inner race 2 formed by two half-races butted together axially, and two rows of rolling balls 3 which are spaced out circumferentially by cages 4. The outer race 1 and the inner race 2 may be given a rotation movement one with respect to the other. The outer race 1 may be stationary or rotating.

The bearing is protected from the outside medium by two annular lateral seals 5. In a radial plane situated between the two rows of balls 3 there are several radial outer ducts 6 passing through the outer race 1 of the bearing, and several radial inner ducts 7 passing through the inner race 2 of the bearing. In the annular space formed by the outer race 1 and inner race 2 and the two rows of balls 3 there is fitted a sealing device 8 allowing a fluid to pass between the outer 6 and inner 7 ducts of the bearing.

The sealing device 8 is formed, in this example, of two separate annular seals 9 which are fitted facing each other axially and symmetrically with respect to the radial plane passing through the outer 6 and inner 7 ducts of the bearing races. Each seal 9 comprises a metal skeleton overmoulded by a flexible material, such as an elastomer. The metal skeleton is formed by a sheet of steel bent so that it has a part 10 for fitting axially onto the outer race 1 of the bearing and a radial reinforcing part for the flexible overmoulding material which extends into a flexible wall 11 of which the free end constitutes a lip 12 for frictional contact with an annular contact surface 13 formed on the inner race 2 of the bearing. The two seals 9 thus fitted delimit an annular intermediate chamber 14 for the passage of the fluid, the intermediate chamber 14 communicating with the outer 6 and inner 7 ducts for the passage of fluid.

As for the seals 9, the frictional contact surfaces (13) formed in the inner race 2 are symmetrical with respect to the radial plane passing through the outer 6 and inner 7 ducts. The contact surfaces 13 are inclined with respect to the axis XX' of the bearing. The flexible walls 11 of the intermediate chamber 14 supporting the sealing lips 12 extend in a direction substantially parallel to the frictional contact surfaces 13. Any variation in pressure of the fluid on the internal faces of the flexible walls 11 therefore results in a variation in the same direction of the contact pressure of the sealing lips 12 on the surfaces 13. In the example illustrated, the inclination of the frictional contact surfaces 13 is of the order of 45° with respect to the axis XX' of the bearing. The contact surfaces are orientated so that they converge toward the inner ducts 7 for the passage of fluid.

In order to improve the frictional characteristics between the sealing lips 12 and the frictional contact surfaces 13, the rubbing zones of the sealing lips 12 are equipped with a Teflon coating 12a, which have better mechanical characteristics than the rubber or elastomer which forms the rest of the sealing lips 12. Secondary sealing lips 15 may also be provided in order to protect the sealing lips 12 from the grease for lubricating the rolling balls 3. The secondary sealing lips 15 may consist of two annular tongues outside the flexible walls 11. The secondary tongues 15 extend obliquely and are in frictional contact with cylindrical contact surfaces of the inner race 2.

FIG. 2 shows an embodiment variant with respect to FIG. 1. In this example, the frictional contact surfaces 13 of the inner race 2 are perpendicular to the axis of the bearing. The flexible walls 11 of the intermediate chamber 14 therefore extend substantially radially.

FIG. 3 shows another variant of the invention for which the contact surfaces 13 are also perpendicular to the axis of the bearing. In this example, instead of two separate seals, the sealing device 8 comprises an annular central body 16 exhibiting an outer circular fastening rim 17 set into an annular groove 18 formed near the outer ducts 6 of the outer race 1. The central body 16 exhibits two inner sealing lips 12 which between them define the annular intermediate chamber 14 communicating with the inner ducts 7. The rubbing zones 12a of the sealing lips 12 are coated with an antifriction substance such as Teflon. Several radial ducts 19 distributed circumferentially pass through the central body 16, connecting the outer ducts 6 of the outer race 1 and the intermediate chamber 14. Thus, the passage of the fluid (air for example) between the outer 6 and inner 7 ducts is allowed in a leaktight fashion by virtue of the particularly compact structure of the annular central body 16.

In the three embodiments previously described, the frictional contact surfaces 13 are machined directly on the inner race 2 of the bearing. In the case where the inner race has slight thickness in the radial direction, such machining runs the risk of adversely affecting the mechanical characteristics required for the said race. It is therefore beneficial in this case to use contact surfaces attached to the inner race with the aid of cups made of steel sheet for example. FIGS. 4 and 5 illustrate two additional embodiments which are equivalent to the two embodiments illustrated in FIGS. 2 and 3. The significant difference lies in the use of a metal support 20 fitted axially on the inner race 2 and having a part extending radially which constitutes a frictional contact surface 13 for the sealing lips 12 of the sealing device. The angle of folding to obtain the contact surface 13 may be other than 90° in order to exhibit an inclination similar to that of FIG. 1.

The axial size of the flexible wall 11 (FIGS. 1, 2 and 4) or of the sealing lips 12 (FIGS. 3 and 5) of the sealing device decreases in a similar way to the cosine of the angle of the frictional contact surface 13 with respect to the axis XX' of rotation of the bearing. This axial size reaches a minimum value in the case where the contact surface 13 is perpendicular to the axis of rotation of the bearing. By virtue of the invention, it is therefore possible to reduce considerably the axial size of the device 8 for sealing against the fluid whilst maintaining its effectiveness, because the flexible walls 11 of the intermediate chamber 14 point substantially in the same direction as the frictional contact surface 13, and because the contact pressure of the sealing lips 12 on the said surface 13 varies in the same direction as the pressure of the fluid inside the intermediate chamber 14. It is possible to choose a rigidity of the flexible wall 11 supporting the sealing lips 12 so that a minimum contact pressure is guaranteed between the sealing lip and the frictional contact surface 13 even for low pressures of fluid inside the intermediate chamber 14.

We claim:

1. Rolling-contact bearing comprising:

a rotating race and a non-rotating race, each of which having ducts therethrough for passage of fluid, rolling elements between the rotating and non-rotating races, and a sealing device fitted between the rotating and non-rotating races in order to define a leaktight intermediate chamber in fluid communication with the ducts for passage of fluid, the intermediate chamber having two flexible walls with free end parts which form two first sealing lips in frictional contact with frictional contact surfaces of one of the races of the bearing, the frictional contact surfaces being inclined with respect to an axis of rotation of the bearing, and the flexible walls extending substantially parallel to the frictional contact surfaces, so that contact pressure between the first sealing lips and the contact surfaces varies in the same direction as the pressure of fluid in the intermediate chamber of the sealing device.

2. Rolling-contact bearing according to claim 1, wherein the frictional contact surfaces are obtained by direct machining of the corresponding race of the bearing.

3. Rolling-contact bearing according to claim 1, wherein the angle of inclination of the frictional contact surfaces lies between 10° and 90°.

4. Rolling-contact bearing according to claim 3, wherein the frictional contact surfaces are generated by generatrices which are segments of a straight line.

5. Rolling-contact bearing according to claim 3, wherein the frictional contact surfaces are generated by generatrices which are segments of a curve.

6. Rolling-contact bearing according to claim 3, wherein the frictional contact surfaces are obtained by direct machining of the corresponding race of the bearing.

7. Rolling-contact bearing according to claim 3, wherein the frictional contact surfaces are attached to the corresponding race by means of a metal support fitted onto the corresponding race.

8. Rolling-contact bearing according to claim 1, wherein the frictional contact surfaces are generated by generatrices which are segments of a straight line.

9. Rolling-contact bearing according to claim 8, wherein the frictional contact surfaces are obtained by direct machining of the corresponding race of the bearing.

10. Rolling-contact bearing according to claim 8, wherein the frictional contact surfaces are attached to the corresponding race by means of a metal support fitted onto the corresponding race.

11. Rolling-contact bearing according to claim 1, wherein the frictional contact surfaces are generated by generatrices which are segments of a curve.

12. Rolling-contact bearing according to claim 11, wherein the frictional contact surfaces are attached to the corresponding race by means of a metal support fitted onto the corresponding race.

13. A rolling-contact bearing according to claim 11, wherein the frictional contact surfaces are obtained by direct machining of the corresponding race of the bearing.

14. Rolling-contact bearing according to claim 1, wherein the frictional contact surfaces are attached to the corresponding race by means of a metal support fitted onto the corresponding race.

15. Rolling-contact bearing according to claim 14, wherein the sealing device includes two separate seals positioned so as to face one another axially.

16. Rolling-contact bearing according to claim 14, wherein the sealing device is made as a single piece with a central body having two first sealing lips which define the intermediate chamber, the central body having a plurality of radial ducts passing therethrough, these radial ducts being in fluid communication with both the ducts in at least one race and with the intermediate chamber.

17. Rolling-contact bearing according to claim 14, wherein the sealing device has two secondary sealing lips in frictional contact with a cylindrical contact surface adjacent to the frictional contact surfaces, for protecting the first sealing lips from lubricant for lubricating the rolling elements of the bearing.

18. A rolling-contact bearing according to claim 17, wherein the sealing device is made as a single piece with a central body having two sealing lips which define the intermediate chamber, the central body having a plurality of radial ducts passing therethrough, these radial ducts being in fluid communication with both the ducts in at least one race and with the intermediate chamber.

19. A rolling-contact bearing according to claim 17, wherein the sealing device includes two separate seals positioned so as to face one another axially.

20. A seal assembly for mounting on a rolling contact bearing assembly including a rotating race and a non-rotating race, at least one of the races having ducts for fluid communication, the seal assembly comprising:

two flexible walls with free end parts which form two first sealing lips, the flexible walls being inclined with respect to an axis of rotation of the rolling contact bearing, the seal assembly having an annular shape in order to define, when positioned between the rotating and non-rotating races of the bearing, an intermediate chamber sealed against fluid.

21. A seal assembly according to claim 20, wherein the seal assembly is formed of two separate seals fitted so as to face one another axially.

22. A seal assembly according to claim 20, wherein the seal assembly is made as a single piece with a central body having two sealing lips which define the intermediate chamber, the central body having a plurality of radial ducts passing therethrough such that, when the seal assembly is positioned between the races of the bearing, these radial ducts of the seal assembly are in fluid communication with both the ducts in at least one race and with the intermediate chamber.

23. A seal assembly according to claim 20, further including two secondary sealing lips for protecting the first sealing lips from lubricant for lubricating rolling elements of the bearing.

* * * * *